United States Patent
Smith

(10) Patent No.: US 9,482,492 B2
(45) Date of Patent: Nov. 1, 2016

(54) BALLISTIC MATERIAL

(71) Applicant: SUPER SKIN SYSTEMS, INC., Lawrenceville, GA (US)

(72) Inventor: Stuart Bruce Smith, Lawrenceville, GA (US)

(73) Assignee: SUPER SKIN SYSTEMS, INC., Lawrenceville, GA (US)

( * ) Notice: Subject to any disclaimer, the term of this patent is extended or adjusted under 35 U.S.C. 154(b) by 0 days.

(21) Appl. No.: 14/636,415

(22) Filed: Mar. 3, 2015

(65) Prior Publication Data
US 2016/0102949 A1    Apr. 14, 2016

Related U.S. Application Data

(60) Provisional application No. 61/947,895, filed on Mar. 4, 2014, provisional application No. 62/015,614, filed on Jun. 23, 2014.

(51) Int. Cl.
| | | |
|---|---|---|
| *F41H 5/00* | (2006.01) | |
| *F41H 5/04* | (2006.01) | |
| *C08G 18/32* | (2006.01) | |
| *C08G 18/50* | (2006.01) | |

(52) U.S. Cl.
CPC .......... *F41H 5/0428* (2013.01); *F41H 5/0457* (2013.01); *F41H 5/0492* (2013.01); *B32B 2571/02* (2013.01); *C08G 18/324* (2013.01); *C08G 18/5021* (2013.01)

(58) Field of Classification Search
CPC ............. B32B 2571/02; F41H 5/0428; F41H 5/0457; F41H 5/0478; C08G 18/324; C08G 18/5021
See application file for complete search history.

(56) References Cited

U.S. PATENT DOCUMENTS

| | | | | |
|---|---|---|---|---|
| 2003/0158369 | A1* | 8/2003 | Slagel | C08G 18/10 528/61 |
| 2007/0111621 | A1* | 5/2007 | Barsoum | B32B 25/04 442/135 |
| 2009/0258974 | A1* | 10/2009 | Slagel | C08G 18/12 524/91 |
| 2012/0174747 | A1* | 7/2012 | Hummel | F41H 5/0414 89/36.02 |
| 2012/0312150 | A1* | 12/2012 | Gamache | F41H 5/0492 89/36.02 |

\* cited by examiner

*Primary Examiner* — Michael L Leonard
(74) *Attorney, Agent, or Firm* — Stetina Brunda Garred & Brucker

(57) ABSTRACT

A polyurea hybrid ballistic armor formed from novel cured reaction products of various diamines and polyester diols with isocyanate curing agents. The cured reaction product can absorb large amounts of energy from ballistic projectiles, and when various hard granular particles are embedded within the cured reaction product, a strike plate effect can be realized, allowing the polyurea hybrid ballistic armor to defeat ballistic projectiles. The polyurea hybrid ballistic armor can additionally be utilized to add additional layers of protection to existing armor systems.

1 Claim, 4 Drawing Sheets

BALLISTIC MATERIAL

CROSS-REFERENCE TO RELATED APPLICATIONS

The present application claims priority to U.S. Provisional Patent Application Ser. No. 61/947,895, entitled BALLISTIC MATERIAL, filed on Mar. 4, 2014, and U.S. Provisional Patent Application Ser. No. 62/015,614, entitled BALLISTIC MATERIAL, filed on Jun. 23, 2014, the teachings of all of which are incorporated herein by reference.

STATEMENT RE: FEDERALLY SPONSORED RESEARCH/DEVELOPMENT

Not Applicable

BACKGROUND

1. Technical Field

The present disclosure relates generally to the field of ballistic materials and composites for defeating ballistic projectiles, and methods of making the same. More particularly, the present disclosure relates to the use of polyurea hybrid composites for those purposes.

2. Related Art

Conventional ballistic materials are often utilized in ballistic vests and in other armor applications to protect military personnel and law enforcement officers from injury or death from ballistic impact trauma. Desirable characteristics of ballistic materials include an ability to absorb the energy of projectiles across a large surface area and slow it down, hardness to destroy the projectile and prevent penetration of fragments, light weight to reduce fatigue from wear, and flexibility or malleability to permit diverse applications and preserve a wearer's mobility.

Existing ballistic materials involve trade-offs between these desired characteristics. For example, modern ballistic vests are principally made from many layers of woven or laminated synthetic fibers, such as para-aramid (Kevlar) or ultra-high-molecular-weight polyethylene (Dyneema). These materials are lightweight and flexible, and will prevent penetration from some handgun rounds. However, ballistic vests made from these materials alone are generally ineffective against large caliber handgun rounds or rifle rounds, and even if a bullet is prevented from penetrating the vest, the wearer may still suffer severe blunt trauma due to back face deflection.

To reduce the effects of back face deflection and to add protection against large caliber pistol rounds and rifle rounds, trauma plates are often utilized in ballistic vests. Metal trauma plates are generally considered to be superior at reducing trauma from back face deflection and at stopping impacts from multiple rounds, but come at the cost of a significant weight increase to the ballistic vest. Ceramic trauma plates are generally considered to be more lightweight than metal trauma plates, but are generally considered to be less effective at stopping impacts from multiple rounds and reducing blunt trauma from back face deflection. Additionally, these materials have a risk of spallation after impact, and often require placement of additional synthetic fiber materials or rubberized coatings on the rear surface to catch any potential spall. Regardless of the construction and material used, however, ballistic vests with trauma plates are significantly heavier than those without, and the protection from a stiff trauma plate cannot extend to areas where flexibility is important without significantly impacting mobility when worn.

The National Institute of Justice promulgates standards for body armor, and classifies five levels of protection (IIA, II, IIIA, III, IV) ranked by ballistic performance. Type IIA armor is rated to protect from 9 mm and .40 S&W bullets. Type II armor is additionally rated to protect from .357 Magnum bullets. Type IIIA armor is further rated to protect from .44 Magnum bullets. Type III armor, which usually includes trauma plates, is rated to protect from up to 7.62 mm rifle bullets. Finally, Type IV armor is rated to protect against up to .30 caliber armor piercing bullets. Law enforcement officers, in the absence of any specific threats or special duties, will typically wear Level IIA or II vests, with vests offering higher grades of protection reserved for special situations or duties justifying additional protection at the cost of added weight and restriction to the wearer's mobility.

Recently, research by the U.S. Navy has revealed the utility of polyurea composite coatings for the purpose of defeating ballistic projectiles. For example, U.S. Pat. No. 8,580,387 describes the utility of a polyureas as a strike surface layer or a spall liner in combination with ceramic or metal armors. Specifically, it was found that a ballistic polyurea coating may be obtained as the cured reaction product of isocyanate and a mixture of two diamines having the general formula $H_2N-Ph-(C=O)-O-(CH_2-CH_2-CH_2-CH_2-O)_n-C=O)-Ph-NH_2$, the first having a value of n between 13 and 14 and the second having a value of n between 2 and 3, in a ratio of 1:0.58 to 1:0.91 by weight. These investigations, however, only scrape the surface of the potential of ballistic polyurea composites, and are largely concerned with vehicle and ship armor. The area as a whole, especially with regards to ballistic vests, remains relatively unexplored.

Consequently, there is a need for improved ballistic polyurea composites for defeating ballistic projectiles.

BRIEF SUMMARY

To solve these and other problems, it is contemplated that modified polyurea hybrid materials may be utilized as ballistic materials. In one embodiment, a polyurea hybrid ballistic armor is contemplated as comprising the cured reaction product of a polyurea prepolymer formed from an isocyanate curing agent and a mixture of polyetheramines having the general formula $CH_3-(CH-CH_3)-NH-[(CH-CH_3)-CH_2-O]_n-CH_2-(CH-CH_3)-NH-(CH-CH_3)-CH_3$ and a mixture of polycaprolactone polyester diols having the general formula $HO-[CH_2-CH_2-CH_2-CH_2-CH_2-(C=O)-O]_n-H$, wherein the mean molecular weight of the polyetheramines is about 2050 and the mean molecular weight of the polycaprolactone polyester diols is about 400.

The isocyanate curing agent may be, for example, methylene diphenyl diisocyanate (MDI), hexamethylene diisocyanate (HDI) Trimer, HDI Biuret, or HDI allophanate. In an exemplary embodiment, the isocyanate curing agent is MDI.

The cured reaction product may be further formed from an effective amount of aromatic diamine to increase temperature resistance, such as dimethyl thio-toluene diamine (DMTDA) and diethyl toluene diamine (DMDTA). In the exemplary embodiment, DMDTA is used.

The cured reaction product may be further formed with an effective amount of isocyanate reaction catalyst, such as zirconium dionate, zirconium acetylacetonate, bismuth carboxylate, aluminum dionate, dibutyltin dilaurate, or dibutyltin diacetate. In the exemplary embodiment, zirconium dionate is used.

A plurality of granular particles may be embedded within the cured reaction product. In the exemplary embodiment, the granular particles are zirconium dioxide and have a particle size distribution of about 18 mesh. In another embodiment, the granular particles are glass and have a particle size distribution of about 4 mesh. It is further contemplated that the plurality of granular particles may have a particle size distribution chosen with the range of about 4 to 20 mesh.

The cured reaction product may have at least one strike portion having substantially all of the plurality of granular particles embedded therein, and at least one non-strike portion having substantially none of the granular particles embedded therein.

In the exemplary embodiment, the cured reaction product is formed from a prepolymer formed from methylene diphenyl diisocyanate (MDI) and a mixture of polyetheramines having the general formula: $CH_3-(CH-CH_3)-NH-[(CH-CH_3)-CH_2-O]_n-CH_2-(CH-CH_3)-NH-(CH-CH_3)-CH_3$, and a mixture of polycaprolactone polyester diols having the general formula, $HO-[CH_2-CH_2-CH_2-CH_2-CH_2-(C=O)-O]_n-H$, wherein the mean molecular weight of the polyetheramines is about 2050, the mean molecular weight of the polycaprolactone polyester diols is about 400, the ratio of the prepolymer to polycaprolactone polyester diol is about 1.66:1, and in the prepolymer, the ratio of MDI to polyetheramines is about 2.2:1.

An additional embodiment of the cured reaction product is contemplated, formed from a mixture of saturated aliphatic polyester diols and an isocyanate curing agent, wherein the mixture of saturated aliphatic polyester diols has a hydroxyl equivalent weight of between 200 and 250.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

According to various aspects of the present disclosure, new types of polyurea hybrid ballistic armor are contemplated. In one embodiment, the polyurea hybrid ballistic armor is formed from the cured reaction product of a polyurea prepolymer formed from polyetheramines and an isocyanate curing agent, and a mixture of polycaprolactone polyester diols. In another embodiment, the polyurea hybrid ballistic armor is formed from a mixture of diamines, saturated aliphatic polyester diols with an equivalent weight between about 200 to 250, and an isocyanate curing agent. Various additives may be added during formation of the cured reaction products, including, for example, aromatic diamines to increase temperature resistance, and isocyanate reaction catalysts. In certain embodiments, a plurality of granular particles may be embedded within the cured reaction product to obtain a strike plate effect. These particles may be, for example but without limitation, glass, steel, or ceramic, and the particles may be sized, arranged and distributed in various configurations within the cured reaction product to confer different anti-ballistic properties to the polyurea hybrid ballistic armor. Alternatively, or in addition to embedding granular particles, traditional antiballistic materials such as anti-ballistic woven or laminated fibers, or steel or ceramic plates may be used in combination with the polyurea hybrid cured reaction product to provide various levels of ballistic protection.

Figure 1:
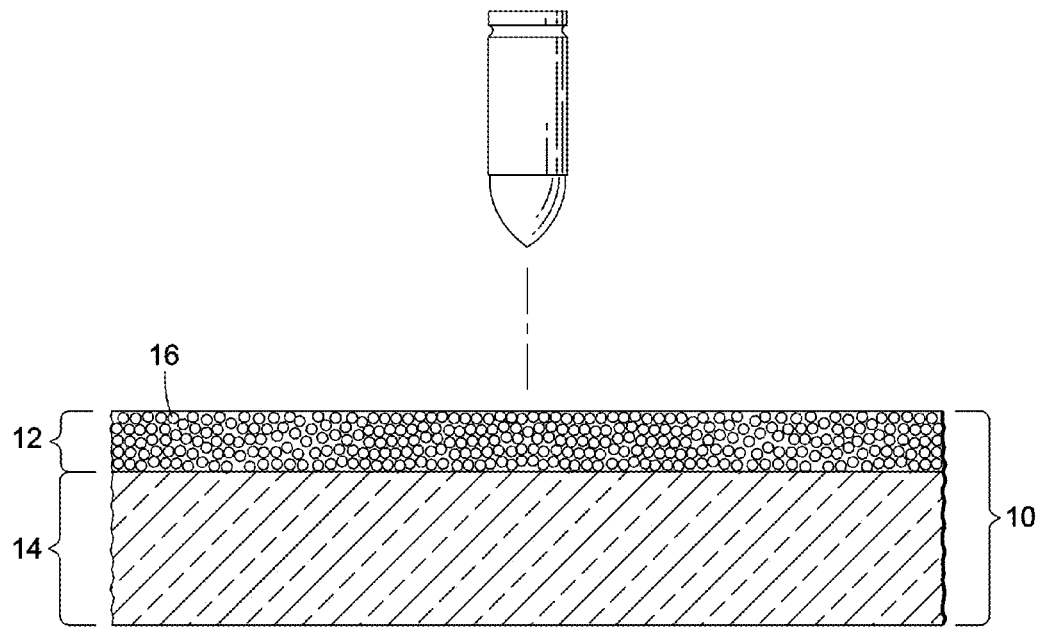
FIG. 1 is a cross-sectional view of one embodiment of a polyurea hybrid ballistic armor having a strike portion and a non-strike portion prior to impact from a firearm projectile.

Referring now to the drawings, and more particularly to FIG. 1, a cross-section of a polyurea hybrid ballistic armor 10 according to an exemplary embodiment of the present invention is shown. In certain embodiments, the polyurea hybrid ballistic armor 10 is formed from the cured reaction product of a prepolymer and a mixture of polycaprolactone polyester diols.

The prepolymer may be formed from an isocyanate curing agent and a mixture of polyetheramines having the general formula:

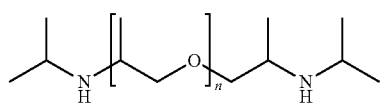

In the exemplary embodiment, the mean molecular weight of the mixture of polyetheramines is about 2050, corresponding to mean value of n of about 33.25. These mixtures of polyetheramines may be made by known methods of synthesis, such as, for example, polymerization of propylene glycol and addition of terminal secondary amine groups, or obtained commercially from manufacturers such as Huntsman Corporation, where a suitable mixture of polyetheramines is sold under the trade name JEFFAMINE SD-2001. However, in other embodiments, it may be seen that polyetheramines may be used having varying mean molecular weights and terminal portions.

The isocyanate curing agent used in the prepolymer may, in the exemplary embodiment, be methylene diphenyl diisocyanate (MDI), which has a % NCO of about 33%. However, it may be seen that in other embodiments, other isocyanate curing agents may be used to form the prepolymer, or combinations of isocyanate curing agents, including but not limited to hexamethylene diisocyanate (HDI) Trimer, HDI Biuret, and HDI allophanate. The MDI used to form the prepolymer in the exemplary embodiment is Pure MDI, the 4,4' isomer of MDI. However, in other embodiments utilizing MDI, other MDI isomers or combinations of MDI isomers may be utilized to form the prepolyer, such as the 2,2' or 2,4' isomer. Pure MDI or other MDI isomers, or combinations of MDI isomers may be made by known methods of synthesis, or obtained commercially from manufacturers such as Dow Corporation, which sells Pure MDI under the trade name ISONATE 125M, or Huntsman Corporation, which sells a mixture of about 70% 4,4' MDI and 30% 2,4' MDI under the trade name SUPRASEC 9150.

The prepolymer is formed by reaction of the isocyanate curing agent with the mixture of polyetheramines. In the exemplary embodiment, the ratio of MDI to polyetheramines is about 2.2:1, and is performed via slow addition of the polyetheramines to MDI in a mixing vessel under agitation, resulting in a prepolymer with a % NCO of about 21%. Use of Pure MDI as opposed to other MDI isomers or combinations of MDI isomers results in a prepolymer with slightly faster reactivity and slightly harder cured reaction product. However, it may be seen that use of other isocyanate curing agents or alterations to the ratio of isocyanate curing agents to polyetheramines may be used to result in the formation of prepolymers having a higher or lower % NCO, with corresponding changes in the attributes of the cured reaction product formed from the prepolymer.

To form the various embodiments of the cured reaction product, the prepolymer may then be reacted with a mixture of polycaprolactone polyester diols having the general formula:

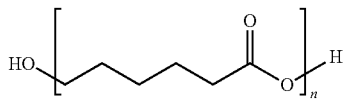

In the exemplary embodiment, the mixture of polycaprolactone polyester diols has a mean molecular weight of about 400, corresponding to a mean value of n of about 3.35. These mixtures of polycaprolactone polyester diols may be made by known methods of synthesis, or obtained commercially from manufacturers such as Perstorp, sold under the brand name Capa 2047A. However, it may be seen that in other embodiments, the mixture of polycaprolactone polyester diols may have different mean molecular weights.

The cured reaction product, in certain embodiments, may be formed by reacting the polyetheramine prepolymer with the mixture of polycaprolactone polyester diols via the hydroxyl-isocyanate reaction, a reaction well-described in the art. In the exemplary embodiment, the reaction occurs via combining a 27% NCO MDI-polyetheramine prepolymer with a mixture of polycaprolactone polyester diols with a mean molecular weight of about 400, with the ratio of prepolymer to polycaprolactone polyester diols of 1.66:1 by weight. However, it may be seen that other ratios of prepolymer to polycaprolactone polyester diols may be utilized.

An effective amount of isocyanate reaction catalyst may additionally be utilized to form those embodiments of cured reaction products formed via the hydroxyl-isocyanate reaction. In the exemplary embodiment, a zirconium dionate chelate is used as a catalyst for this reaction in a ratio of zirconium chelate to polycaprolactone polyester diol of about 1:250. However, it may be seen that in other embodiments, other isocyanate reaction catalyst is may be utilizing, including but not limited to zirconium acetylacetonate, bismuth carboxylate, aluminum dionate, dibutyltin dilaurate, and dibutyltin diacetate. Additionally, it may be seen that other amounts of isocyanate reaction catalysts may be utilized, and an effective amount may constitute any amount of isocyanate reaction catalyst that does not prevent formation of the cured reaction product. Isocyanate reaction catalysts may be made by known methods, or obtained commercially from manufacturers, such as King Industries, which sells a zirconium dionate chelate under the trade name K-KAT 6212.

An effective amount of aromatic diamine may also be utilized in the formation of cured reaction products according to various embodiments in order to increase temperature resistance of the cured reaction product. Cured polyurea reaction products may have a tendency to degrade at higher temperatures, and the addition of an effective amount of aromatic diamines in forming the cured reaction product may raise the temperature resistance of the cured reaction product, which may be especially important for maintaining the integrity and antiballistic properties of a polyurea hybrid ballistic armor 10 when utilized in situations or localities with high temperatures. In the exemplary embodiment of the cured reaction product formed from a MDI/polyetheramine prepolymer and polycaprolactone polyester diols, the aromatic diamine utilized is dimethyl thio-toluene diamine (DMTDA), and it is utilized in a ratio of 2:5 DMTDA to polycaptrolactone polyester diols by weight. However, it may be seen that in the exemplary embodiment or in other embodiments, other aromatic diamines may be utilized to increase the temperature resistance of the cured reaction product, including but not limited to diethyl toluene diamine (DEDTA). Further, an effective amount of aromatic diamine may constitute any amount that does not prevent formation of the cured reaction product.

Example 1

The cured reaction product of the exemplary embodiment was formed by slowly adding 45 pbw of polyetheramines having a mean molecular weight of about 2050 (JEFFAMINE SD2001) to 100 pbw of a 33% NCO mixture of 70% 4,4'-MDI and 30% 2,4'-MDI (SUPRASEC 9150) in a mixing vessel under agitation until addition has been completed, about 15 minutes, resulting in a 21% NCO prepolymer. 83 grams of this prepolymer was then reacted with 50 grams of polycaprolactone polyester diols having a mean molecular weight of about 400 (Capa 2047A), along with 20 grams of dimethyl thio-toluene diamine and 0.2 grams zirconium dionate chelate (K-KAT 6212). This mixture was poured in a 6"×6"×1" mold and cured for three minutes. After 24 hours, the hardness of the cured reaction product was measured as 65 Shore D.

Example 2

Example 1 was repeated, but the prepolymer was instead formed from Pure 4,4'-MDI instead of a mixture of MDI isomers. The resulting prepolymer was slightly faster to react, and produced a harder cured reaction product.

In alternative embodiments, the cured reaction product may be formed from a mixture of saturated aliphatic polyester diols and an isocyanate curing agent, with the mixture of saturated aliphatic polyester diols having a hydroxyl equivalent weight of between about 200 to 250. Saturated aliphatic polyester diols having hydroxyl equivalent weights between about 200 to 250 may be synthesized by known methods, or obtained commercially from manufacturers such as King Industries, which sells an aliphatic polyester diol with a hydroxyl equivalent weight of about 208 under the trade name K-FLEX XM-366, and an aliphatic polyester diol with a hydroxyl equivalent weight of about 250 under the trade name K-FLEX XM-337. In certain of these alternative embodiments, it may be preferred to use various combinations of saturated aliphatic polyester diols. For example, in one alternative embodiment, a mixture of 65% K-FLEX XM-366 and 35% K-Flex XM-337 was found to form an effective antiballistic cured reaction product. However, it may be seen that adjusting the materials used may result in cured reaction products having various hardness, ranging from about 75 Shore D to about 55 Shore A.

The same isocyanate curing agents as described above may be used in these alternative embodiments utilizing saturated aliphatic polyester diols, although HDI trimers, HDI biurets, and HDI allophanates are preferred due to their use permitting a more workable reaction time, with MDI and MDI prepolymers generally resulting in reaction times too rapid for effective curing. In these alternative embodiments, the use of an isocyanate reaction catalyst as discussed earlier in relation to the preferred embodiment is generally not necessary, due to residual catalyst in the saturated aliphatic polyester diols. However, it may be seen that aromatic diamines as discussed above may be utilized in these alternative embodiments to impart heat resistance to the resulting cured reaction product.

The cured reaction product of any of the embodiments discussed may be formed by any method known in the art in which polymers are formed, including but not limited to casting, spraying, and injection molding. It may be seen that depending on the ultimate application, different methods of forming the cured reaction product may be preferable. For example, spraying may be preferable when thinner layers of cured reaction product are used to coat synthetic ballistic fibers such as para-aramid or ultra-high molecular weight polyethelene. Casting may be preferable when solid blocks of cured reaction product are desired. Injection molding may be preferable when forming intricate or form-fitting components, such as ballistic helmets.

Returning now to FIG. 1, the polyurea hybrid ballistic armor 10 may further comprise a plurality of granular particles 16 embedded within the polyurea hybrid ballistic armor 10. The inclusion of the plurality of granular particles 16 within the polyurea hybrid ballistic armor 10 provides a strike plate effect, which may greatly increase the ability of the polyurea hybrid ballistic armor 10 to stop bullet penetration. The plurality of granular particles may have a particle size distribution chosen from within the range of about 4 to 20 mesh, and may be chosen from various materials, including but not limited to glass, ceramics, or metals. The plurality of granular particles 16 may be distributed throughout the cured reaction product, or may be concentrated in a particular area of the cured reaction product. For example, the embodiment of FIG. 1 depicts a strike region 12 having substantially all of the plurality of granular particles 16 embedded therein, and there may be a non-strike region 14 having substantially none of the granular particles embedded therein. It may be preferential in some embodiments to have the strike region 12 entirely saturated with the granular particles 16 embedded therein.

Figure 2:
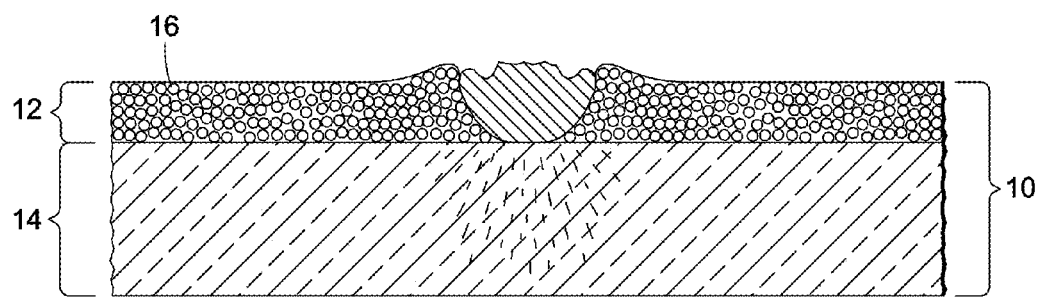
FIG. 2 is a cross-sectional view of one embodiment of a polyurea hybrid ballistic armor having a strike portion and a non-strike portion after impact from a firearm projectile.

Turning now to FIG. 2, it may be seen that a strike layer 12 saturated with the plurality of granular particles 16 may stop and crush an oncoming projectile, with the non-strike layer 14 serving to further absorb the energy of projectile and stop smaller fragments.

Figure 3:
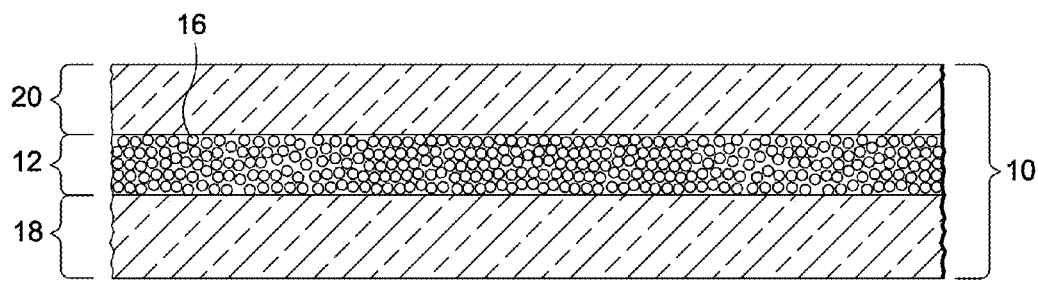
FIG. 3 is a cross-sectional view of an embodiment of a polyurea hybrid ballistic armor having a strike portion in between two non-strike portions.

Turning now to FIG. 3, it may be seen that alternative embodiments are contemplated in which, for example, a strike layer 12 of the polyurea hybrid ballistic armor 10 having substantially all of the granular particles 16 embedded within may be positioned between two non-strike layers 18 and 20, which may provide certain advantages.

Figure 4:
FIG. 4 is a black and white photograph of an embodiment of a polyurea hybrid ballistic armor having a strike portion after impact from a .44 magnum bullet.

Turning now to FIG. 4, a black and white photograph of a 44 magnum bullet destroyed by a strike layer 12 of a polyurea hybrid ballistic armor 10 is shown.

Figure 5:
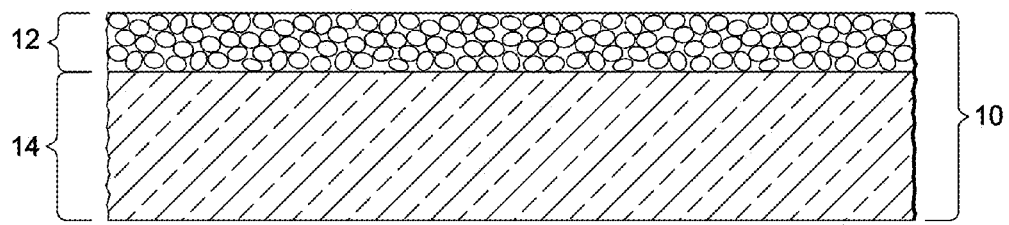
FIG. 5 is a cross-sectional view of an embodiment of a polyurea hybrid ballistic armor having a strike portion with a plurality of granular particles embedded therein with a larger particle size.

Turning now to FIG. 5, it may be seen that in other embodiments of a polyurea hybrid ballistic armor 10, various other materials or sizes of materials may be used in the plurality of granular particles 16. For example, in certain embodiments, it may be preferable to utilize 4 mesh glass beads.

Figure 6:
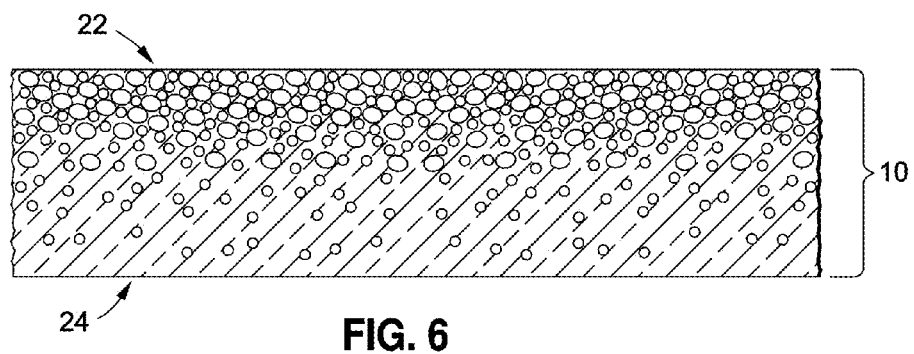
FIG. 6 is a cross-section view of an embodiment of a polyurea hybrid ballistic armor having a plurality of granular particles distributed along a gradient substantially decreasing from the strike face to the back face.

Turning now to FIG. 6, it is contemplated that the plurality of granular particles 16 may be embedded within the cured reaction product of the polyurea hybrid ballistic armor 10 in other arrangements other than in a saturated strike layer. For example, FIG. 6 depicts the plurality of granular particles 16 disposed within the cured reaction product in a gradient, with a high concentration near a strike face of the polyurea hybrid ballistic armor 10 and with a low concentration near a back face 24 of the polyurea hybrid ballistic armor 10.

Figure 7:
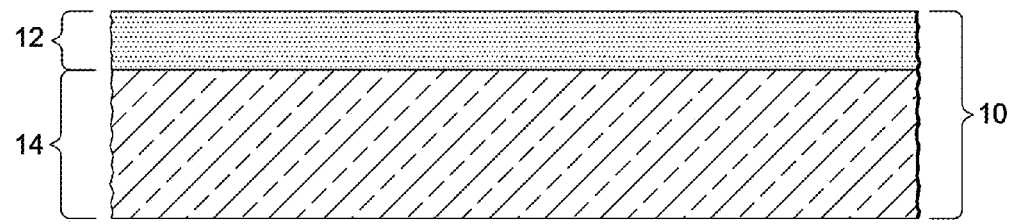
FIG. 7 is a cross-sectional view of an embodiment of a polyurea hybrid ballistic armor having a strike portion with a plurality of granular particles embedded therein with a smaller particle size.

Turning now to FIG. 7, it may be seen that even smaller granular particles may effectively serve to defeat projectiles in combination when in a strike layer 12 of the cured reaction product of the polyurea hybrid ballistic armor 10.

Example 3

The cured reaction product of Example 1 was again formed, but this time 184 grams of 18 mesh zirconium oxide beads were added prior to curing. The high specific gravity of the zirconium oxide beads resulted in a 3/16 inch layer of the cured reaction product saturated with zirconium oxide beads, and a ½" layer of cured reaction product with substantially no zirconium oxide beads. This sample was shot with a 0.44 magnum round, and the bullet failed to penetrate the layer of the cured reaction product saturated with the zirconium oxide beads. The sample was shot twice more with 0.44 magnum rounds, both within one inch of the first round, all with the same result of no penetration through the zirconium oxide bead saturated layer, indicating a level IIIA NIJ rating. The cured reaction product displayed no splitting or cracking. The test was repeated with aluminum oxide beads instead of zirconium oxide, with no penetration through the cured reaction product.

Figure 8:
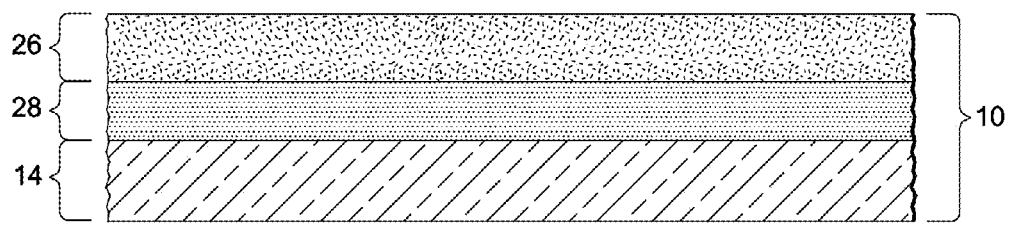
FIG. 8 is a cross-sectional view of an embodiment of a polyurea hybrid ballistic armor having a first strike portion with a plurality of granular particles embedding therein with a medium particle size, a second strike portion with a plurality of granular particles embedding therein with a smaller particle size, and a non-strike portion.

Turning now to FIG. 8, it may be seen that multiple strike layers 26 and 28 may be utilized to obtain even greater protection, as opposed to a single strike layer 12. Various combinations and configurations of strike layers containing granular particles 16 and non-strike layers not containing granular particles 16 may be utilized to obtain desired levels of protection.

Example 4

The cured reaction product of Example 3 was formed, and the process was repeated in the same mold, resulting in a front strike layer, a middle non-strike layer, and another strike layer followed by a rear non-strike layer. The sample was shot with a 7.62 mm rifle round. The first strike layer and non-strike layer was penetrated, but the bullet was defeated by the second strike layer, indicating a level III NIJ rating. The sample was shot twice more, with the same results, and no cracking or splitting.

Figure 9:
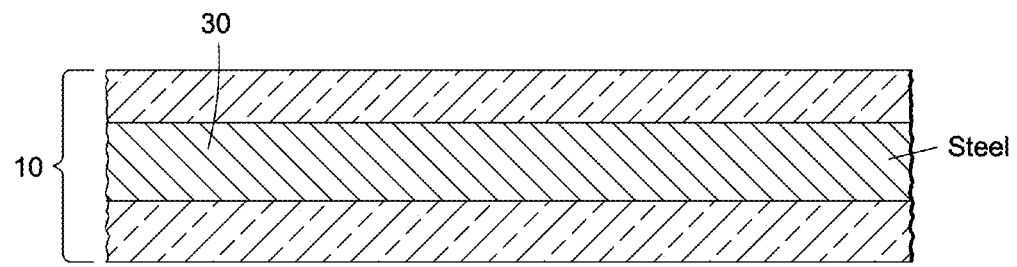
FIG. 9 is a cross-sectional view of an embodiment of a polyurea hybrid ballistic armor having a steel strike plate embedded therein.

Turning now to FIG. 9, it is further contemplated that the polyurea hybrid ballistic armor 10 may be utilized with other materials, such as, instead of a strike layer 12, an incorporated solid material 30. The solid material 30 may be, in some embodiments, steel trauma plates. In this way, it may be seen that the cured reaction product in the polyurea hybrid ballistic armor 10 may serve to up-armor traditional or existing armor systems, for example, to serve as a spall liner, or to add additional protection to allow an existing armor system to defeat even more dangerous ballistic threats.

Figure 10:
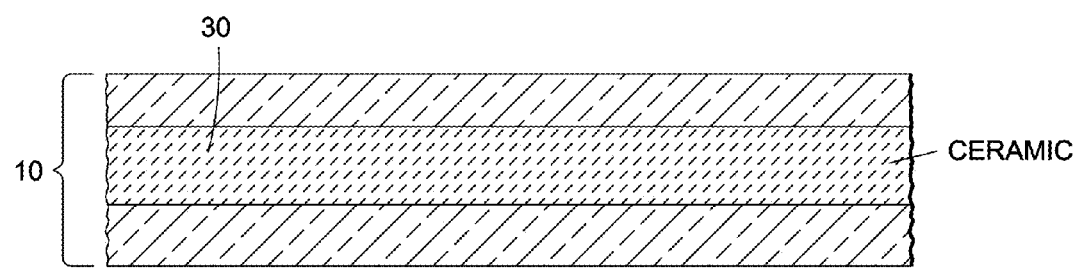
FIG. 10 is a cross-sectional view of an embodiment of a polyurea hybrid ballistic armor having a ceramic strike plate embedded therein.

Turning now to FIG. 10, it may be seen that other materials may be utilized with the cured reaction product of the polyurea hybrid ballistic armor 10 as presently disclosed, such as ceramic trauma plates.

Figure 11:
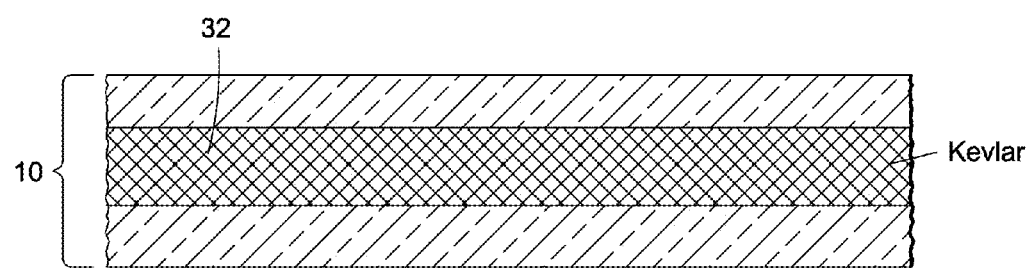
FIG. 11 is a cross-sectional view of an embodiment of a polyurea hybrid ballistic armor coating a layer of kevlar.

Turning now to FIG. 11, it is additionally contemplated that the polyurea hybrid ballistic armor 10 as presently disclosed may be applied as coatings to flexible ballistic materials 32 such as kevlar to add additional protection without necessitating the addition of a heavier metal or ceramic strike plate, or to add additional protection in areas which may not be protected by strike plates. For example, a thin 20-40 mil coating of cured reaction product containing glass beads may be added to level II kevlar or dyneema sheet of polyurea hybrid ballistic armor 10 was capable of increasing the threat protection to level IIIA.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A polyurea hybrid ballistic armor comprising:
   the cured reaction product of:
   a prepolymer formed from methylene diphenyl diisocyanate (MDI) and a mixture of polyetheramines having the general formula:

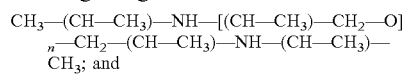

a mixture of polycaprolactone polyester diols having the general formula:

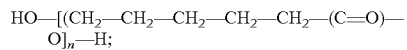

wherein the mean molecular weight of the polyetheramines is about 2050, the mean molecular weight of the polycaprolactone polyester diols is about 400, the ratio of the prepolymer to polycaprolactone polyester diol is about 1.66:1 by weight, and in the prepolymer, the ratio of MDI to polyetheramines is about 2.2:1 by weight.

* * * * *